US009039308B2

(12) United States Patent
Tokura et al.

(10) Patent No.: US 9,039,308 B2
(45) Date of Patent: May 26, 2015

(54) FOCAL PLANE SHUTTER AND OPTICAL DEVICE

(75) Inventors: Shoichi Tokura, Chiba (JP); Hiroshi Takahashi, Chiba (JP); Seiichi Oishi, Chiba (JP); Kazuya Shioda, Chiba (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 13/586,035

(22) Filed: Aug. 15, 2012

(65) Prior Publication Data

US 2013/0084060 A1    Apr. 4, 2013

(30) Foreign Application Priority Data

Sep. 29, 2011    (JP) ................... 2011-215405

(51) Int. Cl.
*G03B 17/00* (2006.01)
*G03B 9/36* (2006.01)

(52) U.S. Cl.
CPC ...................... *G03B 9/36* (2013.01)

(58) Field of Classification Search
USPC .................. 396/453, 454, 479–482
See application file for complete search history.

(56) References Cited

U.S. PATENT DOCUMENTS

| 5,997,188 | A   | * | 12/1999 | Takahashi et al. ............ 396/487 |
| 2001/0028799 | A1 |   | 10/2001 | Nakagawa |
| 2002/0136555 | A1 | * | 9/2002  | Watabe et al. ................ 396/453 |
| 2009/0238554 | A1 | * | 9/2009  | Niwamae ...................... 396/484 |

FOREIGN PATENT DOCUMENTS

| JP | 2001-281726    | 10/2001 |
| JP | 2006-208980 A1 | 8/2006  |
| JP | 2007-102015 A  | 4/2007  |

OTHER PUBLICATIONS

Notification of Reason(s) for Refusal mailed Sep. 10, 2013 from the Japanese Patent Office Action in counterpart application No. 2011-215405 with English translation.
Notification of Reason(s) for Refusal mailed May 27, 2014 from the Japanese Patent Office Action in counterpart application No. 2011-215405 with English translation.

* cited by examiner

*Primary Examiner* — Clayton E LaBalle
*Assistant Examiner* — Noam Reisner
(74) *Attorney, Agent, or Firm* — Krat, Quintos & Hanson, LLP

(57) ABSTRACT

A focal plane shutter includes: first, second, and third boards respectively including openings through which light enters an image pickup element from an object side, and arranged in this order from the object side toward the image pickup element side; a blade arranged between the first and second boards and capable of opening and closing the openings; and a holding member arranged between the second and third boards, not coupled to the blade, and holding the second board from the image pickup element side.

10 Claims, 14 Drawing Sheets

//FOCAL PLANE SHUTTER AND OPTICAL DEVICE

CROSS-REFERENCE TO RELATED APPLICATION

This application is a based upon and claims priority to Japanese Patent Application No. 2011-215405 filed on Sep. 29, 2011, subject matter of these patent documents is incorporated by reference herein in its entirety.

BACKGROUND (i) Technical Field

The present invention relates to focal plane shutters and optical devices.

(ii) Related Art

A focal plane shutter installed in a camera can be arranged near an image pickup element in consideration of a reduction in thickness of the camera itself. In this case, when a blade of the focal plane shutter closes an opening and stops, the blade might be bent toward the image pickup element side to come into contact therewith. Thus, the image pickup element might be damaged. In Japanese Patent Unexamined Application Publication No. 2006-208980, in consideration of such a problem, the blade includes a first blade and a second blade in an order decreasing movable amounts, and the second blade has rigidity higher than that of the first blade.

However, in a case where the blade includes plural blades having different rigidities, the whole weight of the shutter might increase depending on a material of the second blade. This might influence a shutter speed. Also, in a case where the first blade is made of synthetic resin and the second blade is made of metal, the second blade might cut the first blade to make dust.

Further, in a case where both the first and second blades are made of synthetic resin, the second blade might not ensure the high rigidity. For example, in a case where the shutter speed is high, when the blade closes the opening and stops, a large impact is applied to the blade. Furthermore, for example, in a case where the image pickup element and the focal plane shutter are large, in response to this, the blade is also large. Thus, when the blade closes the opening and stops, the large impact is applied to the shutter. Therefore, when the large impact is applied to the blade, it might be difficult to suppress the bending of the blade including the first and second blades made of synthetic resin.

SUMMARY

It is therefore a focal plane shutter where a blade is prevented from coming into contact with an image pickup element, and an optical device, with reduced size, having the same.

According to an aspect of the present invention, there is provided a focal plane shutter including: first, second, and third boards respectively including openings through which light enters an image pickup element from an object side, and arranged in this order from the object side toward the image pickup element side; a blade arranged between the first and second boards and capable of opening and closing the openings; and a holding member arranged between the second and third boards, not coupled to the blade, and holding the second board from the image pickup element side.

DETAILED DESCRIPTION

Figure 1:
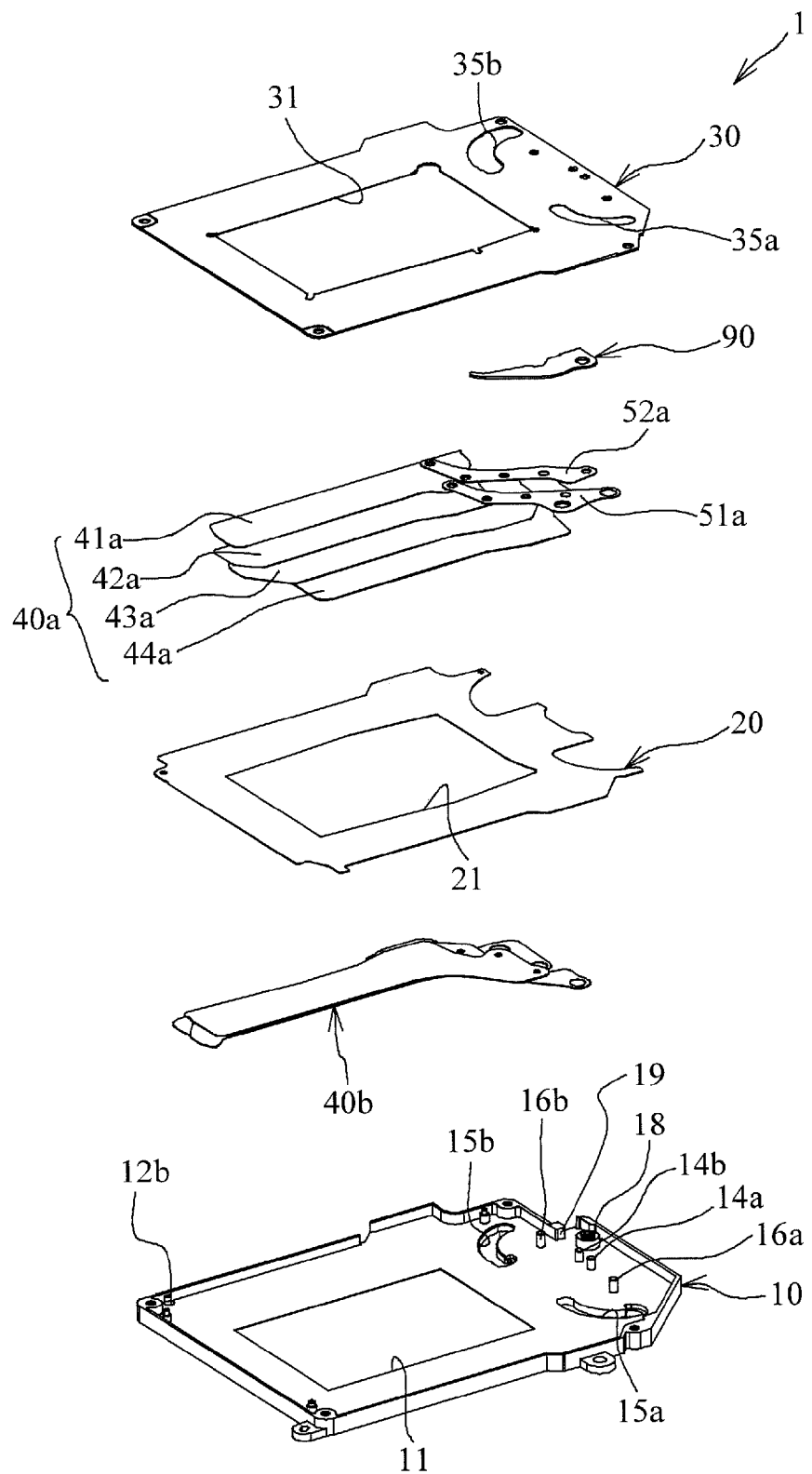
FIG. 1 is an exploded perspective view of a focal plane shutter according to a present embodiment.

FIG. 1 is an exploded perspective view of a focal plane shutter 1 according to the present embodiment. The focal plane shutter 1 includes: boards 10, 20, and 30; a leading blade 40a; a trailing blade 40b; drive arms 51a and 52a driving the leading blade 40a; and a holding member 90 as will be described later. Additionally, as not illustrated in FIG. 1, the focal plane shutter 1 further includes: two drive arms driving the trailing blade 40b; a drive lever for driving the drive arm 51a; a drive lever for driving the arm driving the trailing blade 40b; and two electromagnets positioning the two drive levers at respective predetermined positions.

The boards 10, 20, and 30 respectively include openings 11, 21, and 31 each having a rectangular shape. Each of the boards 10, 20, and 30 is made of synthetic resin and has a thin plate shape. The boards 10 and 30 respectively include escape slots 15a and 35a and escape slots 15b and 35b for receiving drive pins of the two drive levers. Also, the board 10 is provided with a supporting portion 18 for supporting the holding member 90. The board 10 is provided with spindles 14a, 14b, 16a, and 16b. The boards 10 and 30 are assembled into each other with the board 20 sandwiched there between. The trailing blade 40b is arranged between the boards 10 and 20. The leading blade 40a and the holding member 90 are arranged between the boards 20 and 30. The openings 11, 21 and 31 are opened or closed by the leading blade 40a and the trailing blade 40b. The leading blade 40a and the trailing blade 40b are examples of a second blade and a first blade, respectively.

Figure 2:
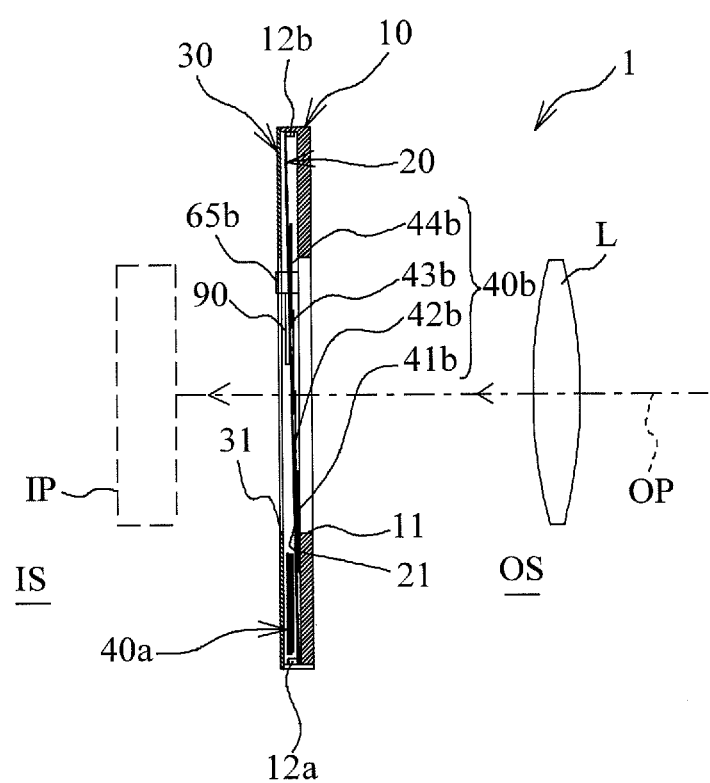
FIG. 2 is a sectional view of the focal plane shutter after assembled.

FIG. 2 is a sectional view of the focal plane shutter after assembled. FIG. 2 illustrates positional relationships the focal plane shutter 1, a lens L, and an image pickup element IP in a case where these are installed in a camera. Additionally, in FIG. 2, the drive levers and the electromagnets are also omitted. For example, the image pickup element IP is a CMOS or a CCD. The lens L is arranged at the object side OS. The light passed through the lens L enters the image pickup element IP through the openings 11, 21, and 31. As illustrated in FIG. 2, the boards 10, 20, and 30 are arranged in this order from the subject side OS toward the image pickup element side IS. The boards 10, 20, and 30 are examples of a first board, a second board, and a third board, respectively. The focal plane shutter 1 is arranged perpendicular to an optical axis OP. The board 20 prevents any one of the leading blade 40a and the drive arms 51a and 52a from interfering with any one of the trailing blade 40b and the drive arms coupled thereto. In FIG. 2, the leading blade 40a is in a receded state where blades thereof overlap one another and recede from the openings 11, 21, and 31, and the trailing blade 40b is in a closed state where blades thereof expand and close the openings 11, 21, and 31.

Figure 3:
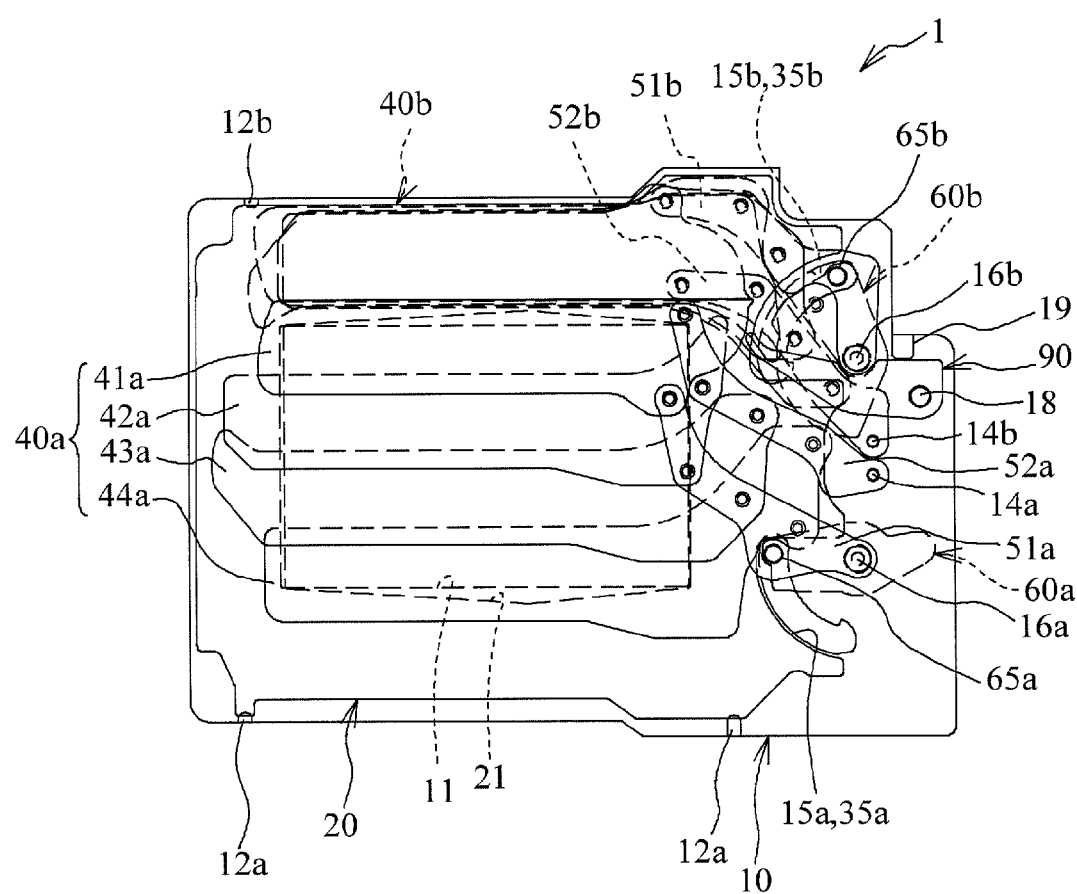
FIG. 3 is a front view of the focal plane shutter.

FIG. 3 is a front view of the focal plane shutter 1. FIG. 3 illustrates a state where the leading blade 40a and the trailing blade 40b are set. Additionally, in FIG. 3, the board 30 is omitted, and the focal plane shutter 1 is illustrated when viewed from the image pickup element side IS. The leading blade 40a is in the closed state where the blades thereof expand and close the openings 11, 21, and 31, and the trailing blade 40b is in the receded state where the blades thereof overlap one another and recede from the openings 11, 21, and 31. The leading blade 40a includes four blades 41a to 44a. Likewise, the trailing blade 40b includes four blades 41b to 44b.

Drive levers 60a and 60b are arranged at the object side OS of the board 10. The trailing blade 40b is coupled to the drive arms 51b and 52b. The drive levers 60a and 60b are respectively provided for driving the leading blade 40a and the trailing blade 40b. As illustrated in FIG. 3, the drive lever 60a is swingably supported by a spindle which is provided coaxially with the spindle 16a and which protrudes outwardly from the board 10. Likewise, the drive lever 60b is swingably supported by a spindle which is provided coaxially with the spindle 16b and which protrudes outwardly from the board 10. The drive levers 60a and 60b are provided with drive pins 65a and 65b, respectively. When the drive levers 60a and 60b swing, the drive pins 65a and 65b move within the escape slots 15a and 35a and the escape slots 15b and 35b, respectively.

The drive arms 51a and 51b are swingably supported by the spindles 16a and 16b, respectively. Thus, the drive arm 51a and the drive lever 60a are swingably supported coaxially with each other. Likewise, the drive arm 51b and the drive lever 60b are swingably supported coaxially with each other. The drive pins 65a and 65b respectively fit into holes formed in the drive arms 51a and 51b. Therefore, the drive arms 51a and 51b are coupled to the drive levers 60a and 60b, respectively. When the drive lever 60a swings, the drive arm 51a swings about the spindle 16a. Also, the drive arms 52a and 52b are coupled to the leading blade 40a and the trailing blade 40b and are swingably supported by the spindles 14a and 14b of the board 10, respectively.

Thus, when the drive lever 60a swings, the drive arm 51a swings about the spindle 16a. In response to this, the leading blade 40a moves. In response to the movement of the leading blade 40a, the drive arm 52a also swings. Likewise, when the drive lever 60b swings, the drive arm 51b swings about the spindle 16b. In response to this, the trailing blade 40b moves.

The drive levers 60a and 60b will be described in brief. The drive levers 60a and 60b are respectively provided with iron pieces not illustrated. The focal plane shutter 1 is provided with first and second electromagnets, not illustrated, capable of adsorbing with iron pieces of the drive levers 60a and 60b, respectively. The drive levers 60a and 60b are biased by springs, not illustrated, in such a direction as to move away from the first and second electromagnets, respectively. The drive levers 60a and 60b are switched between a state where the drive levers 60a and 60b are respectively adsorbed to the first and second electromagnets and a state where the drive levers 60a and 60b respectively are spaced away from the first and second electromagnets by the biasing forces of the springs. When the drive pin 65a of the drive lever 60a is positioned at first ends of the escape slots 15a and 35a, the iron piece of the drive lever 60a abuts with the first electromagnet. When the drive pin 65b of the drive lever 60b is positioned at the first ends of the escape slots 15b and 35b, the iron piece of the drive lever 60b abuts with the second electromagnet. Also, the drive lever 60a is biased by the spring such that the drive pin 65a moves from the first ends of the escape slots 15a and 35a to second ends thereof. Likewise, the drive lever 60b is biased by the spring such that the drive pin 65b moves from first ends of the escape slots 15b and 35b to second ends thereof.

As illustrated in FIGS. 2 and 3, holding portions 12a and 12b are provided at side walls formed in the periphery of the board 10. The holding portion 12a is provided at a position to form a clearance between the holding portion 12a and the inner surface of the board 10. A first end of the board 20 is inserted into the clearance formed between the holding portion 12a and the inner surface of the board 10. Also, a second end of the board 20 is arranged on the holding portion 12b. That is, the second end of the board 20 is held between the upper portion of the holding portion 12b and the inner surface of the board 30. Therefore, the board 20 is arranged between the boards 10 and 30 and is inclined with respect thereto.

The reason why the board 20 is inclined in such a way is follows. In the receded state where the leading blade 40a and the trailing blade 40b recede from the openings 11, 21, and 31, the blades of each of the leading blade 40a and the trailing blade 40b overlap one another and the blades 40a and 40b are the thickest. Additionally, the leading blade 40a recedes from the openings 11, 21, and 31 to one side thereof, and the blades of the leading blade 40a overlap one another. The trailing blade 40b recedes from the openings 11, 21, and 31 to the other side thereof, and the blades of the trailing blade 40b overlap one another. Therefore, in order to reduce the distance between the boards 10 and 30 as possible and to arrange the leading blade 40a and the trailing blade 40b being the thickest between the boards 10 and 30, the board 20 is inclined.

The holding member 90 is swingably supported by the supporting portion 18 of the board 10. The holding member 90 is made of metal and has a thin plate shape. The holding member 90 is arranged on a trajectory of the drive pin 65b of the drive lever 60b. The holding member 90 is biased clockwise by a spring, in FIG. 3. Also, the board 10 is provided with a stopper 19 for stopping the holding member 90. Abutment of the holding member 90 with the stopper 19 restricts the holding member 90 from swinging clockwise. The holding member 90 is not coupled to the leading blade 40a, the trailing blade 40b, the drive arms 51a, 52a, 51b, and 52b, and the drive levers 60a and 60b. The holding member 90 will be described in detail later.

Figure 4:
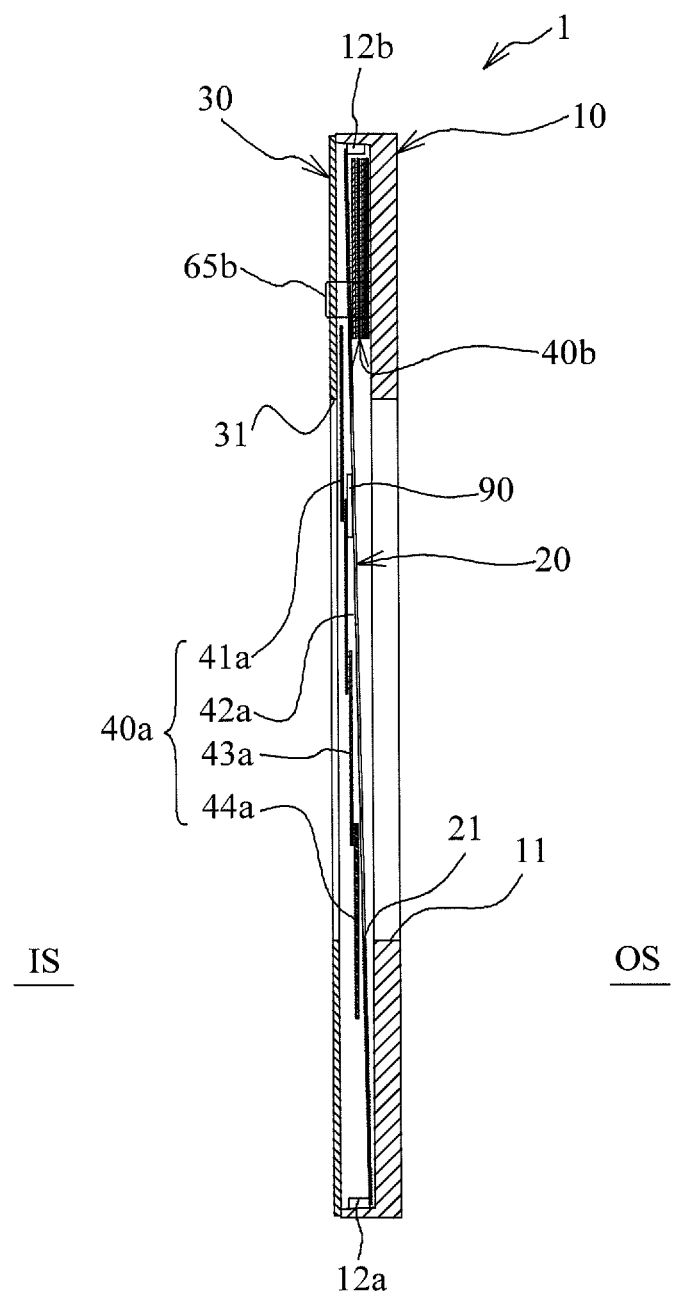
FIG. 4 is an explanatory view of the operation of the focal plane shutter.

The operation of the focal plane shutter 1 will be described below. FIGS. 3 to 10 are explanatory views of the operation of the focal plane shutter 1. Additionally, FIGS. 5, 7, and 9 partially illustrate the focal plane shutter 1. FIGS. 3 and 4 illustrate an initial state of the focal plane shutter 1. FIG. 4 is a sectional view of the focal plane shutter 1. In this initial state, a set lever, not illustrated, is secured at an initial position, the blades of the leading blade 40a expand and close the openings 11, 21, and 31, the blades of the trailing blade 40b overlap one another and recede from the openings 11, 21, and 31. In this initial state, the iron piece of the drive lever 60a is set at such an initial position as to abut with the first electromagnet and to be adsorbed thereto. Likewise, the iron piece of the drive lever 60b is set as such an initial position as to abut with the second electromagnet and to be adsorbed thereto.

In shooting, a release button of the camera is pushed, and then coils of the first and second electromagnets are energized. Therefore, the iron piece of the drive lever 60a is adsorbed to the first electromagnet, and the iron piece of the drive lever 60b is adsorbed to the second electromagnet. After that, the set lever recedes from the drive levers 60a and 60b. At this time, the drive levers 60a and 60b are held and adsorbed to the first and second electromagnets, respectively.

Figure 5:
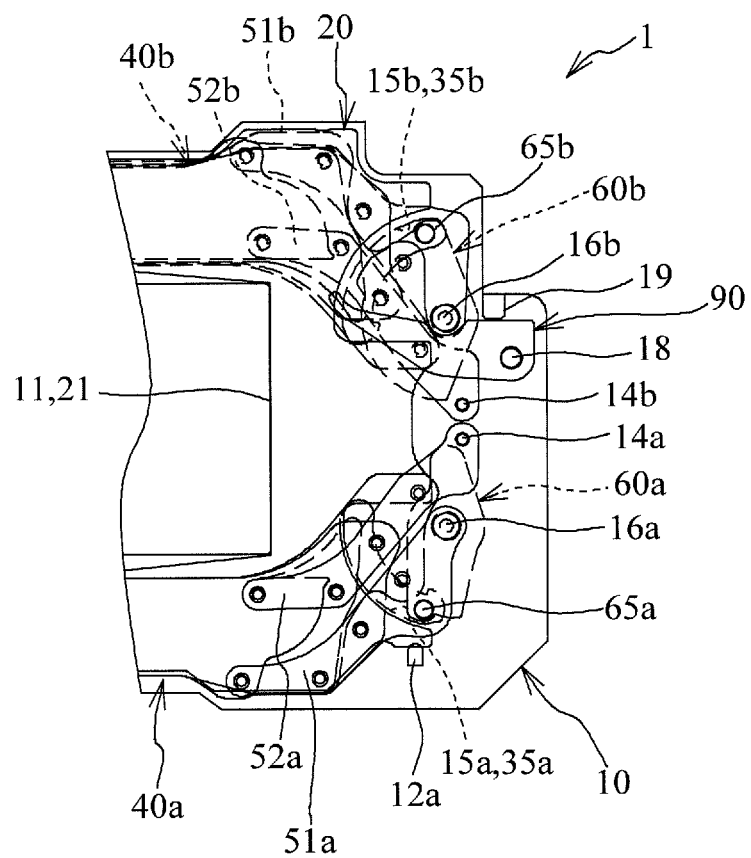
FIG. 5 is an explanatory view of the operation of the focal plane shutter.
Figure 6:
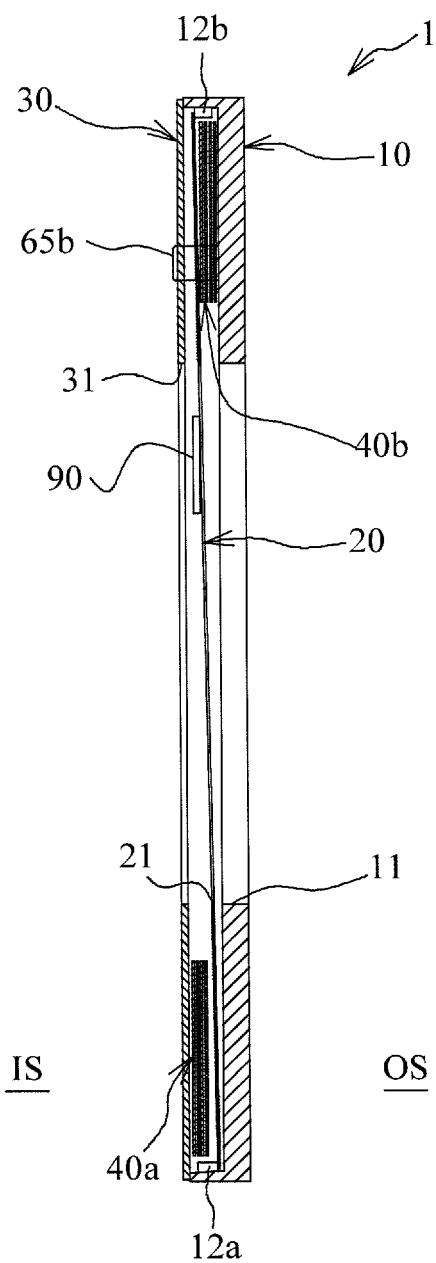
FIG. 6 is an explanatory view of the operation of the focal plane shutter.

The energization of the coil of the first electromagnet is cut off, and then the drive lever 60a swings counterclockwise in accordance with the biasing force of the spring as illustrated in FIGS. 5 and 6. FIG. 6 is a sectional view of the focal plane shutter 1 illustrated in FIG. 5. Thus, the leading blade 40a recedes from the openings 11, 21, and 31 to be in an overlapped state. Also, the energization of the coil of the second electromagnet is maintained for a predetermined period so as to maintain the receded state where the trailing blade 40b recedes from the openings 11, 21, and 31. Therefore, the openings 11, 21, and 31 are in an opened state. FIGS. 5 and 6 illustrate an exposure state.

Figure 7:
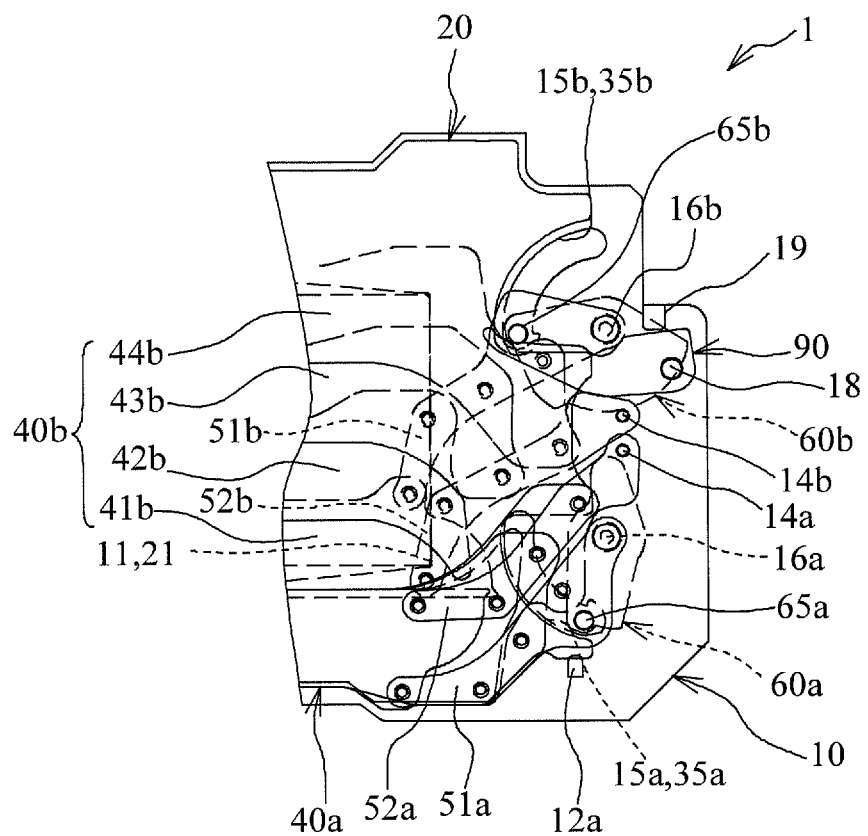
FIG. 7 is an explanatory view of the operation of the focal plane shutter.
Figure 8:
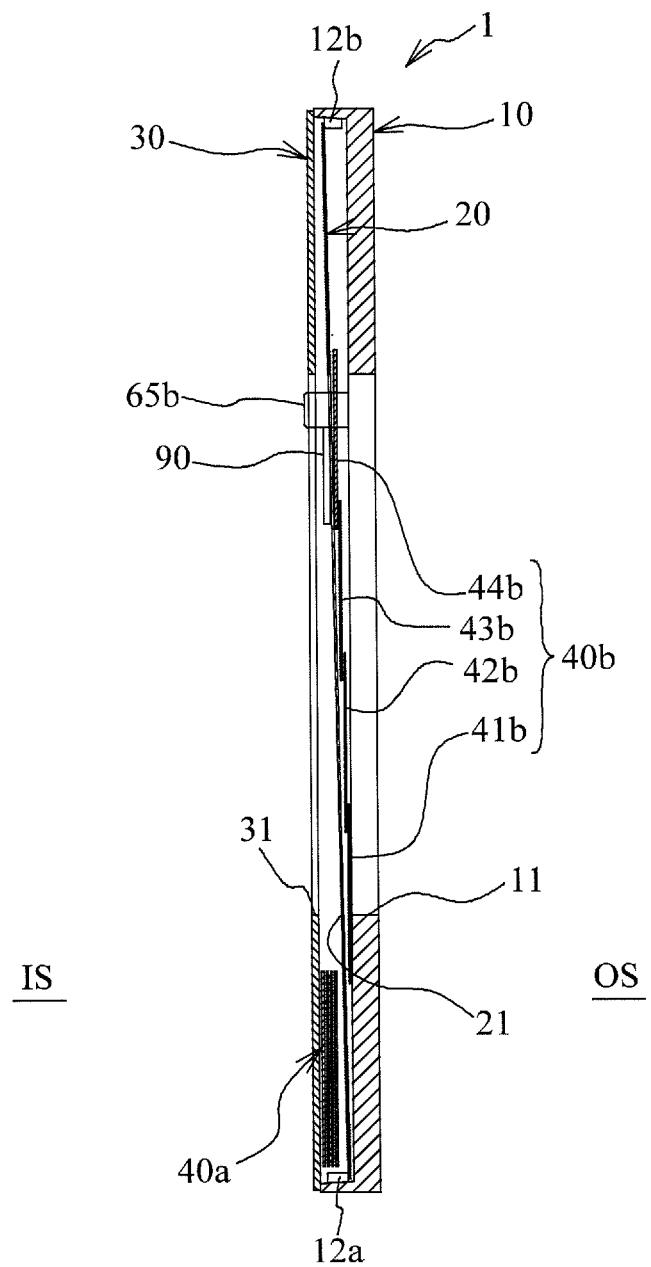
FIG. 8 is an explanatory view of the operation of the focal plane shutter.

After a predetermined period lapses from a time when the release button is pushed, the energization of the coil of the second electromagnet is cut off, and then the drive lever 60b swings counterclockwise in accordance with the biasing force of the spring. Therefore, the trailing blade 40b expands and closes the openings 11, 21, and 31. The drive pin 65b of the drive lever 60b abuts with the second ends of the escape slots 15b and 35b. FIGS. 7 and 8 illustrate the state just after the exposure operation is finished. FIG. 8 is a sectional view of the focal plane shutter 1 illustrated in FIG. 7. In such a way, one cycle of shooting is finished.

In this manner, after the leading blade 40a starts moving to open the openings 11, 21, and 31, the trailing blade 40b starts moving to close the openings 11, 21, and 31.

Figure 9:
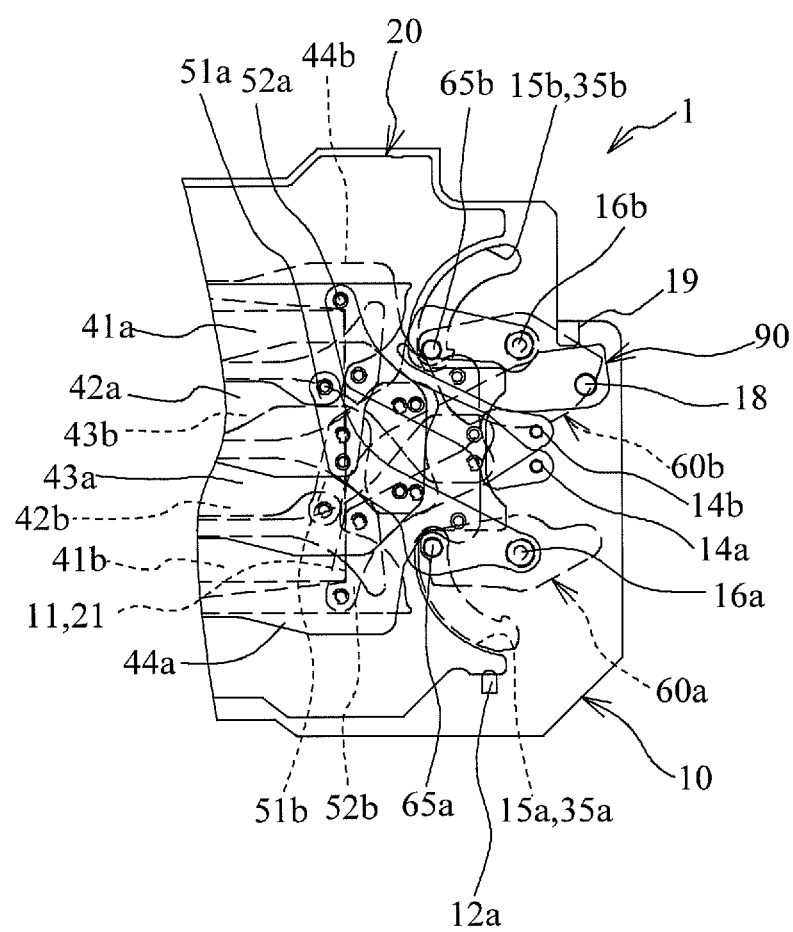
FIG. 9 is an explanatory view of the operation of the focal plane shutter.
Figure 10:
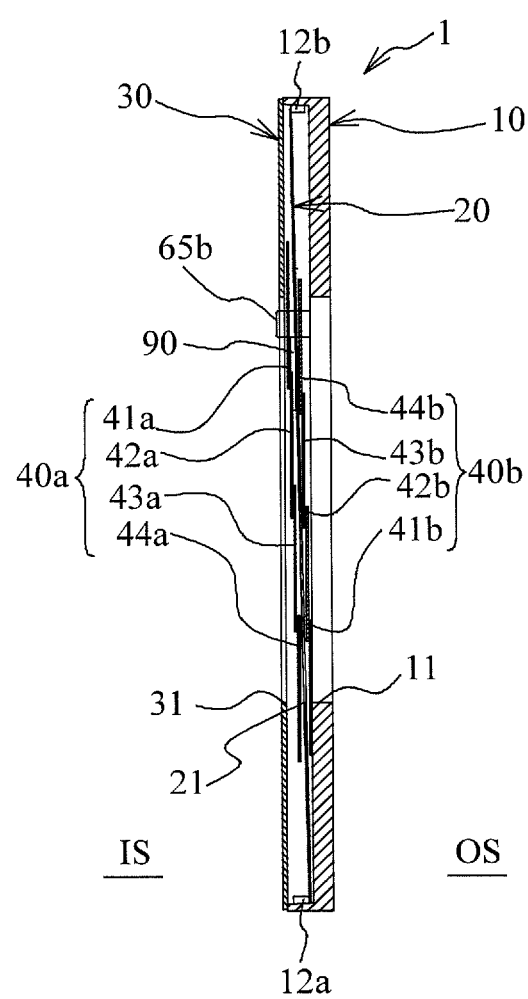
FIG. 10 is an explanatory view of the operation of the focal plane shutter.

Next, the drive lever 60a is swung clockwise by the set lever not illustrated. Therefore, the leading blade 40a closes the openings 11, 21, and 31. FIGS. 9 and 10 illustrate a state where only the leading blade 40a is set. FIG. 10 is a sectional view of the focal plane shutter 1 illustrated in FIG. 9. After that, the drive lever 60b is swung clockwise by the set lever not illustrated. Therefore, the trailing blade 40b recedes from the openings 11, 21, and 31 and is set to the initial state illustrated in FIGS. 3 and 4.

Next, the holding member 90 will be described below. As illustrated in FIGS. 7 and 8, when the movement of the trailing blade 40b is finished, the drive pin 65b of the drive lever 60b is stopped by abutment with the second ends of the escape slots 15b and 35b. At this time, the impact is applied to the trailing blade 40b, the drive arms 51b and 52b, and the like. Therefore, the trailing blade 40b might be bent in the direction of the image pickup element side IS, and might come into contact with the image pickup element IP through the openings 21 and 31. When the trailing blade 40b is bent in the direction of the image pickup element side IS in such a way, it is conceivable that the board 20 moves in the direction of the image pickup element side IS.

Herein, the distance between the holding portion 12a and the inner surface of the board 10 is greater than the thickness of the board 20. Likewise, the distance between the holding portion 12b and the inner surface of the board 30 is greater than the thickness of the board 20. In such a way, each of the distance between the holding portion 12a and the inner surface of the board 10 and the distance between the holding portion 12b and the inner surface of the board 30 is greater than the thickness of the board 20. This reason is that the assembling property of the board 20 with the board 10 is considered. For this reason, in a case where the holding member 90 is not provided, the board 20 can move between the boards 10 and 30 in the optical axis direction to some extent.

In a case where the board 20 can move between the boards 10 and 30 to some extent, the trailing blade 40b might be bent in the direction of the image pickup element side IS right after the trailing blade 40b stops. In this case, it is conceivable that the trailing blade 40b is bent to push the board 20 toward the image pickup element side IS, that it, toward the board 30. When the trailing blade 40b is bent in such a way, the trailing blade 40b might come into contact with the image pickup element IP through the openings 21 and 31.

However, in the focal plane shutter 1 according to the present embodiment, the holding member 90 is arranged between the boards 20 and 30. The holding member 90 is supported by the supporting portion 18 to hardly move in the optical axis OP direction. Specifically, after a fitting hole formed in the holding member 90 fits onto an end of the supporting portion 18, the holding member 90 is secured by a non-illustrated screw in the optical axis OP direction and is capable of swinging about the supporting portion 18. This restricts the holding member 90 from moving in the axial direction of the supporting portion 18. That is, the holding member 90 is restricted from moving in the optical axis OP direction. Thus, the holding member 90 restricted from moving in the optical axis OP direction holds the board 20 from the image pickup element side IS such that the board 20 does not move or is not bent to the image pickup element side IS. This suppresses the trailing blade 40b from being bent to the image pickup element side IS. Thus, the focal plane shutter 1 according to the present embodiment suppresses the image pickup element from being damaged.

In such a way, the holding member 90 does not directly hold the trailing blade 40b to suppress the bending thereof toward the image pickup element side IS, but uses the board 20 having a comparatively large area to suppress the bending of the trailing blade 40b. Also, in the state where the trailing blade 40b is expanded, the trailing blade 40b has the whole large area. Thus, use of the board 20 having the large area like one of the trailing blade 40b efficiently suppresses the expanded trailing blade 40b from being bent.

Next, a function of the holding member 90 will be described below. FIGS. 11 to 14 are an enlarged views around the holding member 90. In FIGS. 11 to 14, the several members are omitted. The holding member 90 has the function to buffer the impact applied to the trailing blade 40b at the time when the trailing blade 40b stops.

Figure 11:
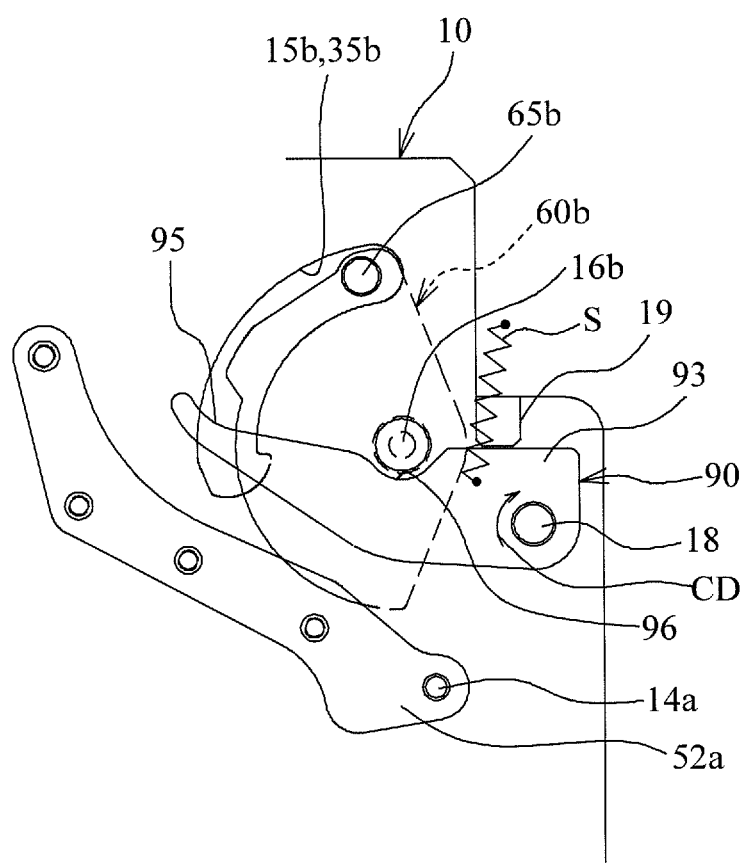
FIG. 11 is an enlarged view around a holding member.

FIG. 11 is an enlarged view around the holding member 90 in the initial state illustrated in FIG. 3. A rear end 93 of the holding member 90 is swingably supported by the supporting portion 18. A front end 95 of the holding member 90 is arranged on a trajectory of the drive pin 65b and is abuttable with the drive pin 65b.

Also, the holding member 90 is biased by a spring S to swing in the clockwise direction CD. The spring S biases the holding member 90 in the direction opposite to the direction in which the spring biases the drive lever 60b. Although the spring S is schematically illustrated in FIGS. 11 to 14, the spring S may be a torsion spring located around the supporting portion 18, a leaf spring, or a coil spring. One end of the spring S has only to engage with the board 10 or 30, the other end of the spring S has only to engage with the holding member 90.

The holding member 90 is provided at its substantially middle portion with a recess portion 96 for avoiding interference with the spindle 16b. Since the recess portion 96 is provided, the supporting portion 18 supporting the holding member 90 can be arranged close to the spindle 16b while avoiding the abutment of the holding member 90 with the spindle 16b. Therefore, the holding member 90 can be arranged in a narrow space.

The width of the holding member 90 becomes gradually narrower from the rear end 93 toward the front end 95. For this reason, as illustrated in FIG. 11, the holding member 90 does not interfere with the drive arm 52a which maintains the expanded state of the leading blade 40a.

Figure 12:
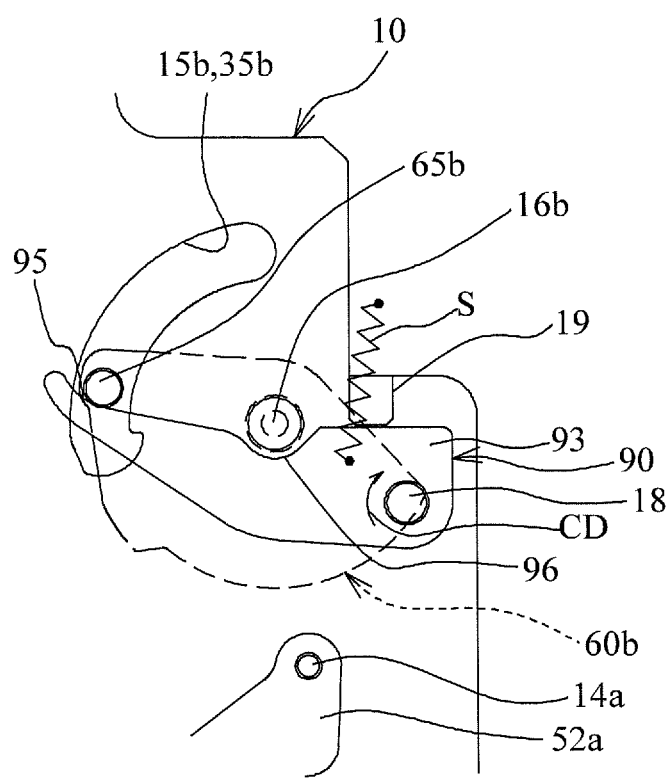
FIG. 12 is an enlarged view around the holding member.

When the energization of the second electromagnet is cut off in the state where the second electromagnet is adsorbed with the iron piece of the drive lever 60b, the drive lever 60b swings counterclockwise in accordance with the biasing force of the spring. When the drive lever 60b swings counterclockwise, the drive pin 65b moves from a start end to a terminal end of its swinging range. While the drive pin 65b is moving from the start end to the terminal end, specifically, while the trailing blade 40b is moving in a latter half of a movable range in which the trailing blade 40b closes the openings 11, 21, and 31, the drive pin 65b abuts with the front end 95 of the holding member 90. FIG. 12 illustrates a state where the drive pin 65b abuts with the holding member 90.

As mentioned above, the holding member 90 is biased in the direction opposite to the direction where the drive lever 60b is biased. Thus, after the drive pin 65b abuts with the holding member 90, the drive lever 60b swings counterclockwise in accordance with the biasing force of the spring biasing the drive lever 60b against the biasing force of the spring S biasing the holding member 90. After that, the drive pin 65b abuts with the terminal end of the swinging range, that is, the second ends of the escape slots 15b and 35b.

Figure 13:
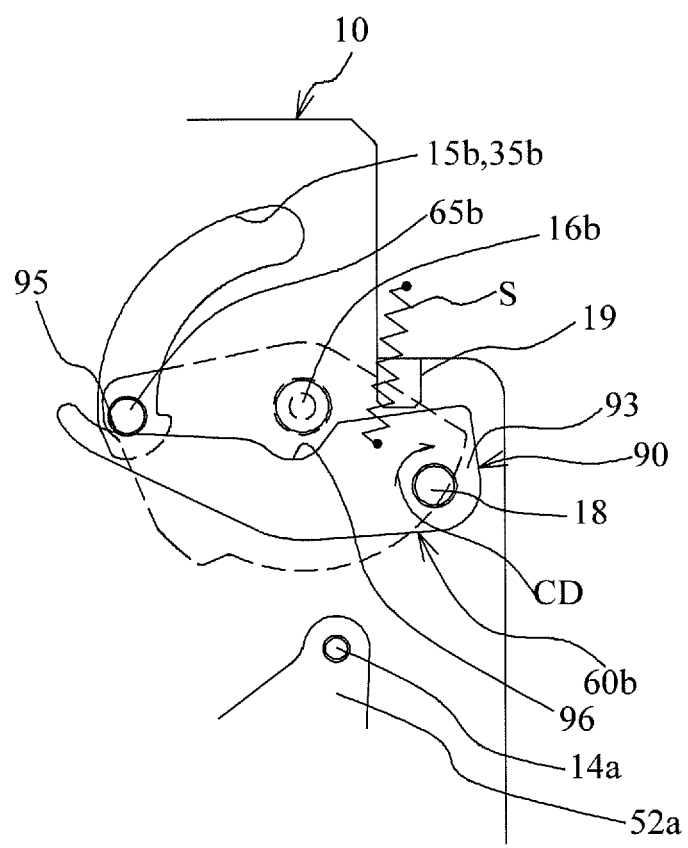
FIG. 13 is an enlarged view around the holding member.

FIG. 13 illustrates a state where the drive pin 65b abuts with the second ends of the escape slots 15b and 35b. Additionally, the second ends of the escape slots 15b and 35b are provided with a rubber, not illustrated, for buffering the impact of the drive pin 65b.

Figure 14:
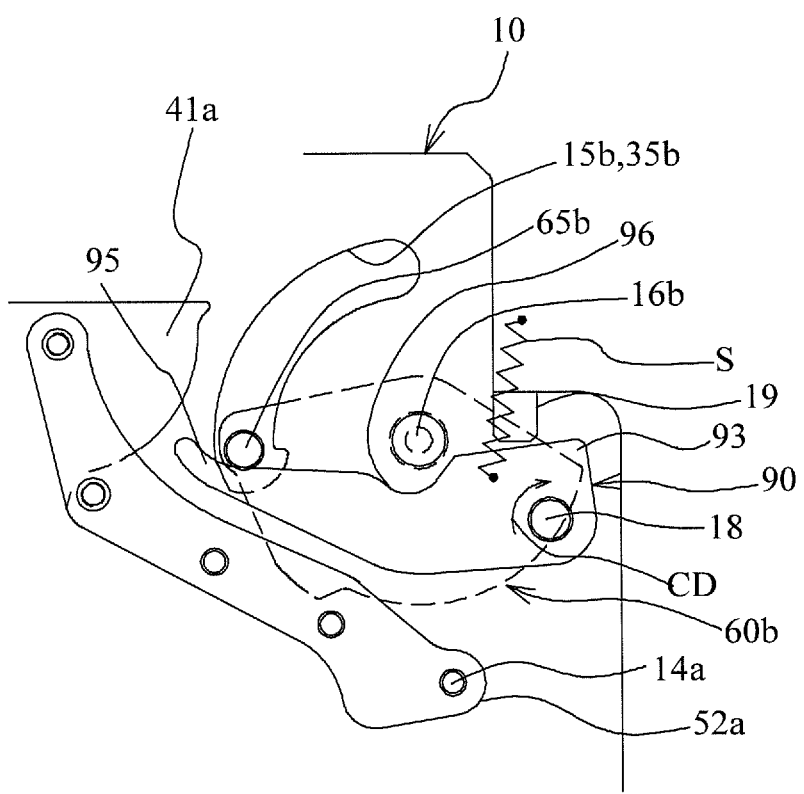
FIG. 14 is an enlarged view around the holding member.

When only the leading blade 40a is set afterwards, the drive arm 52a comes closer to the holding member 90. FIG. 14 is an enlarged view around the holding member 90 illustrated in FIG. 9. As illustrated in FIG. 14, even when the holding member 90 is pushed counterclockwise by the drive lever 60b, the holding member 90 does not interfere with the drive arm 52a. In other words, the holding member 90 is arranged in an area which the movable range of the leading blade 40a does not overlap. This is because the width of the holding member 90 becomes narrower from the rear end 93 to the front end 95.

Thus, when the drive pin 65b is moving toward the terminal end of the swinging range, the holding member 90 abuts with the drive pin 65b, so that the swinging speed of the drive lever 60b is reduced. The holding member 90 has a function as a braking member braking the movement of the trailing blade 40b in the direction where the trailing blade 40b closes the openings 11, 21, and 31. Therefore, the swinging speed of the drive lever 60b is reduced, before the drive lever 60b stops. It is thus possible to suppress the impact generated by the abutment of the drive pin 65b with the second ends of the escape slots 15b and 35b. Accordingly, the trailing blade 40b is suppressed from being bent toward the image pickup element side IS.

As mentioned above, the holding member 90 holds the board 20 from the image pickup element side IS, thereby suppressing the trailing blade 40b from being bent toward the image pickup element side IS. Further, the holding member 90 reduces the swinging speed of the drive lever 60b before the drive lever 60b stops, thereby suppressing the impact generated in stopping the trailing blade 40b. This further suppresses the trailing blade 40b from being bent.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment is applicable to optical devices such as still cameras, and digital cameras. The distance between the focal plane shutter and the image pickup element can be reduced, thereby reducing the size of the optical device equipped with the focal plane shutter according to the present embodiment.

In the above embodiment, the boards 20 and 30, and the blades are made from synthetic resin. However, these may be have plate shapes made from metal.

In the above embodiment, each of the leading blade and the trailing blade includes four blades, but is not limited to this. Each of the leading blade and the trailing blade may includes at least two blades.

In the above examples, the holding member 90 suppresses the trailing blade 40b from being bent toward the image pickup element side IS. However, a blade suppressed from being bent is not limited to the trailing blade 40b. For example, in a case where the leading blade 40a is arranged at the object side OS and the trailing blade 40b is arranged at the image pickup element side IS, the holding member 90 may be configured to suppress the leading blade 40a from being bent toward the image pickup element side IS.

After, in the above embodiment, in the shooting, after the leading blade 40a fully opens the openings 11, 21, and 31, the trailing blade 40b closes the openings 11, 21, and 31. However, these arrangements are not limited. The leading blade 40a and the trailing blade 40b may move together with the substantially constant distance between the blade 41a of the leading blade 40a and the blade 41b of the trailing blade 40b maintained.

Finally, several aspects of the present invention are summarized as follows.

According to an aspect of the present invention, there is provided a focal plane shutter including: first, second, and third boards respectively including openings through which light enters an image pickup element from an object side, and arranged in this order from the object side toward the image pickup element side; a blade arranged between the first and second boards and capable of opening and closing the openings; and a holding member arranged between the second and third boards, not coupled to the blade, and holding the second board from the image pickup element side.

The holding member holds the second board from the image pickup element side, thereby suppressing the blade from being bent toward the image pickup element side. This prevents the blade from coming into contact with the image pickup element. It is thus possible to reduce the distance between the focal plane shutter and the image pickup element. Also, it is possible to achieve a reduction in size of a camera equipped with the focal plane shutter according to the present invention.

According to another aspect of the present invention, there is provided a focal plane shutter including: first, second, and third boards respectively including openings through which light enters an image pickup element from an object side, and arranged in this order from the object side toward the image pickup element side; a first blade arranged between the first and second boards and capable of opening and closing the openings; a second blade arranged between the second and third boards and capable of opening and closing the openings; and a braking member braking movement of the first blade in a latter half of a movable range in which the first blade moves and closes the openings, wherein the braking member is arranged between the second and third boards.

According to another aspect of the present invention, there is provided an optical device including the above focal plane shutter.

What is claimed is:

1. A focal plane shutter comprising:
   first, second, and third boards respectively including openings through which light enters an image pickup element from an object side, and arranged in this order from the object side toward the image pickup element side;
   a blade arranged between the first and second boards and capable of opening and closing the openings;
   another blade arranged between the second and third boards and capable of opening and closing the openings;
   a holding member arranged between the second and third boards, not coupled to the blade, and holding the second board from the image pickup element side, wherein the holding member is swingably provided in a predetermined range and the holding member directly abuts with the second board, and wherein the holding member has a circumferential portion, the circumferential portion containing a recess portion in a substantially middle portion of said circumferential portion, wherein any one of the blade and the another blade does not abut with the holding member; and
   a drive arm capable of swinging, arranged between the second and third boards, and driving the blade, wherein the recess portion escapes a spindle supporting the drive arm for swinging, the recess portion directly facing the spindle.

2. The focal plane shutter of claim 1, further comprising a drive lever swingably provided in a predetermined range, biased in a predetermined direction, and driving the blade,
   wherein the holding member is swingably provided in a predetermined range, is capable of abutting with the drive lever while the drive lever is swinging in accordance with a biasing force of the biasing member, and is biased in a direction opposite to the direction where the drive lever is biased.

3. The focal plane shutter of claim 1, further comprising a drive arm capable of swinging, arranged between the second and third boards, and driving the blade,
   wherein the recess portion escapes a spindle supporting the drive arm for swinging.

4. The focal plane shutter of claim 1, wherein the holding member becomes narrower from a rear end swingably supported toward a front end abuttable with the drive lever.

5. The focal plane shutter of claim 1, wherein the another blade is a leading blade arranged between the second and third boards and is capable of opening and closing the openings,
   wherein the blade is a trailing blade that starts moving to close the openings after the leading blade starts moving to open the openings.

6. A focal plane shutter comprising:
   first, second, and third boards respectively including openings through which light enters an image pickup element from an object side, and arranged in this order from the object side toward the image pickup element side;
   a first blade arranged between the first and second boards and capable of opening and closing the openings;
   a second blade arranged between the second and third boards and capable of opening and closing the openings;
   a braking member braking movement of the first blade in a latter half of a movable range in which the first blade moves and closes the openings, wherein the braking member is arranged between the second and third boards;
   the braking member arranged between the second and third boards, not coupled to the blade, and holding the second board from the image pickup element side, wherein the braking member is swingably provided in a predetermined range and the braking member directly abuts with the second board, and wherein the braking member has a circumferential portion, the circumferential portion containing a recess portion in a substantially middle portion of said circumferential portion, wherein any one of the first blade and the second blade does not abut with the braking member; and
   a drive arm capable of swinging, arranged between the second and third boards, and driving the blade, wherein the recess portion escapes a spindle supporting the drive arm for swinging, the recess portion directly facing the spindle.

7. The focal plane shutter of claim 6, wherein the braking member is arranged not to overlap a movable range of the second shutter.

8. The focal plane shutter of claim 6, wherein the braking member suppresses the second board from moving or bending toward the third board side.

9. An optical device comprising
   a focal plane shutter comprising:
      first, second, and third boards respectively including openings through which light enters an image pickup element from an object side, and arranged in this order from the object side toward the image pickup element side;
      a blade arranged between the first and second boards and capable of opening and closing the openings;
      another blade arranged between the second and third boards and capable of opening and closing the openings;
      a holding member arranged between the second and third boards, not coupled to the blade, and holding the second board from the image pickup element side, wherein the holding member is swingably provided in a predetermined range and the holding member directly abuts with the second board, and wherein the holding member has a circumferential portion, the circumferential portion containing a recess portion in a substantially middle portion of said circumferential portion, wherein any one of the blade and the another blade does not abut with the holding member; and
      a drive arm capable of swinging, arranged between the second and third boards, and driving the blade, wherein the recess portion escapes a spindle supporting the drive arm for swinging, the recess portion directly facing the spindle.

10. An optical device comprising
    a focal plane shutter comprising:
       first, second, and third boards respectively including openings through which light enters an image pickup element from an object side, and arranged in this order from the object side toward the image pickup element side;
       a first blade arranged between the first and second boards and capable of opening and closing the openings;
       a second blade arranged between the second and third boards and capable of opening and closing the openings;

a braking member braking movement of the first blade in a latter half of a movable range in which the first blade moves and closes the openings, wherein the braking member is arranged between the second and third boards;

the braking member arranged between the second and third boards, not coupled to the blade, and holding the second board from the image pickup element side, wherein the braking member is swingably provided in a predetermined range and the braking member directly abuts with the second board, and wherein the braking member has a circumferential portion, the circumferential portion containing a recess portion in a substantially middle portion of said circumferential portion, wherein any one of the first blade and the second blade does not abut with the braking member; and a drive arm capable of swinging, arranged between the second and third boards, and driving the blade, wherein the recess portion escapes a spindle supporting the drive arm for swinging, the recess portion directly facing the spindle.

* * * * *